United States Patent Office

3,397,295
Patented Aug. 13, 1968

3,397,295
INDUCTION TUBE WELDING APPARATUS
James Hale, Oldbury, England, assignor to Tube Products Limited, Birmingham, England, a British company
Filed Feb. 1, 1965, Ser. No. 429,232
Claims priority, application Great Britain, Feb. 28, 1964, 8,540/64
4 Claims. (Cl. 219—8.5)

ABSTRACT OF THE DISCLOSURE

In the manufacture of welded tube by the continuous high frequency induction process employing an induction coil located around the tube a short distance in advance of the weld point an intensifier comprising a bridge of material of high magnetic permeability is located over the induction coil in radial alignment with the converging edges of the strip from which the tube is formed.

Detailed description

This invention relates to improvements in the manufacture of welded tube by the continuous high frequency induction process.

Normally a strip is brought into the form of a tube by forming rolls and the edges of the strip converge to a weld point at which they are forced together by pressure rolls, the converging edges of the strip being heated to welding temperature by an induction coil located around the tube a short distance in advance of the weld point. An impeder of ferrite or other material of high magnetic permeability may be located within the tube to reduce the flow of current around the back of the tube and to assist in concentrating the heating effect of the induced current in the converging edges of the strip.

According to our invention we provide over the induction coil in radial alignment with the gap between the converging edges of the strip a bridge of ferrite or similar material of high magnetic permeability.

The bridge acts as an intensifier which produces a better distribution of the induced current which is concentrated in the edges of the strip.

The bridge may be employed with or without an impeder within the tube.

Figure 1:
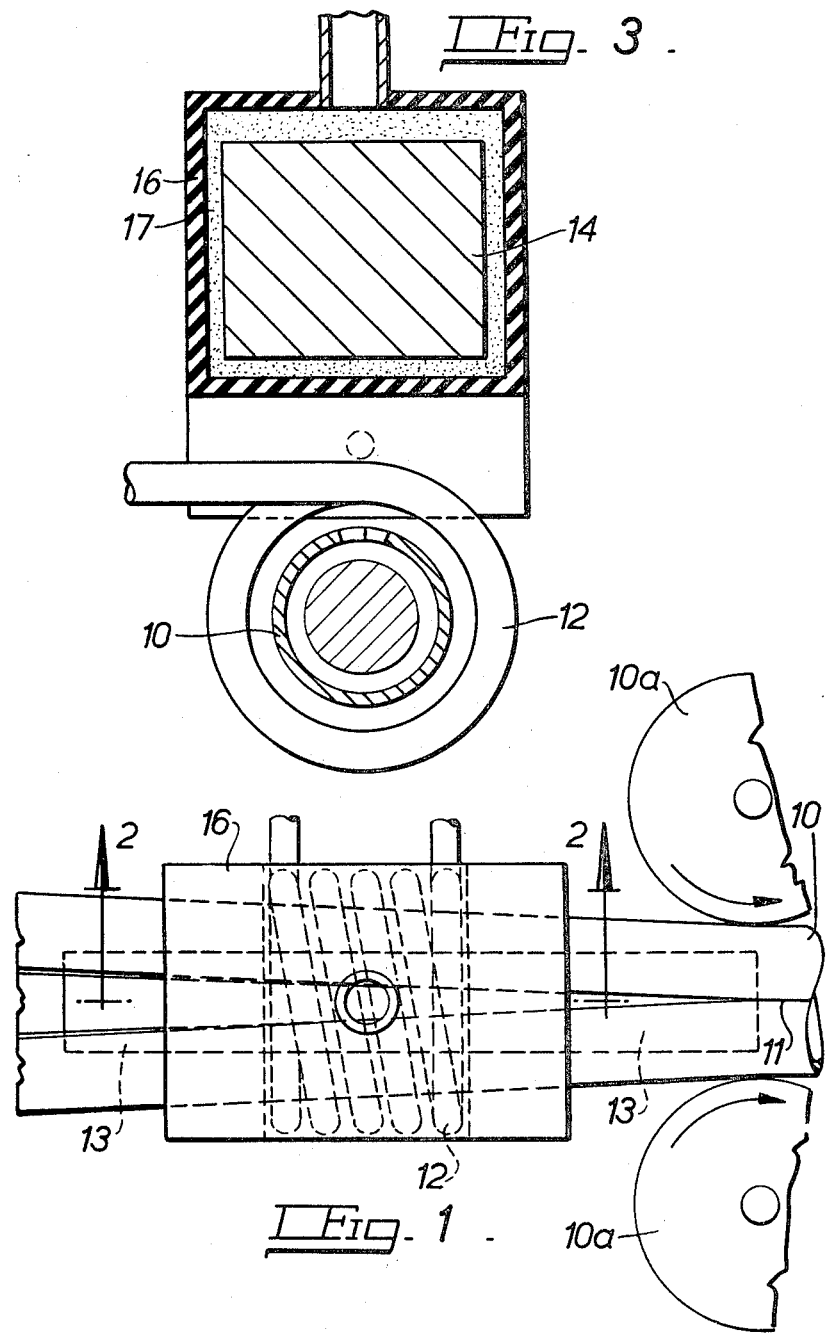
Figure 2:
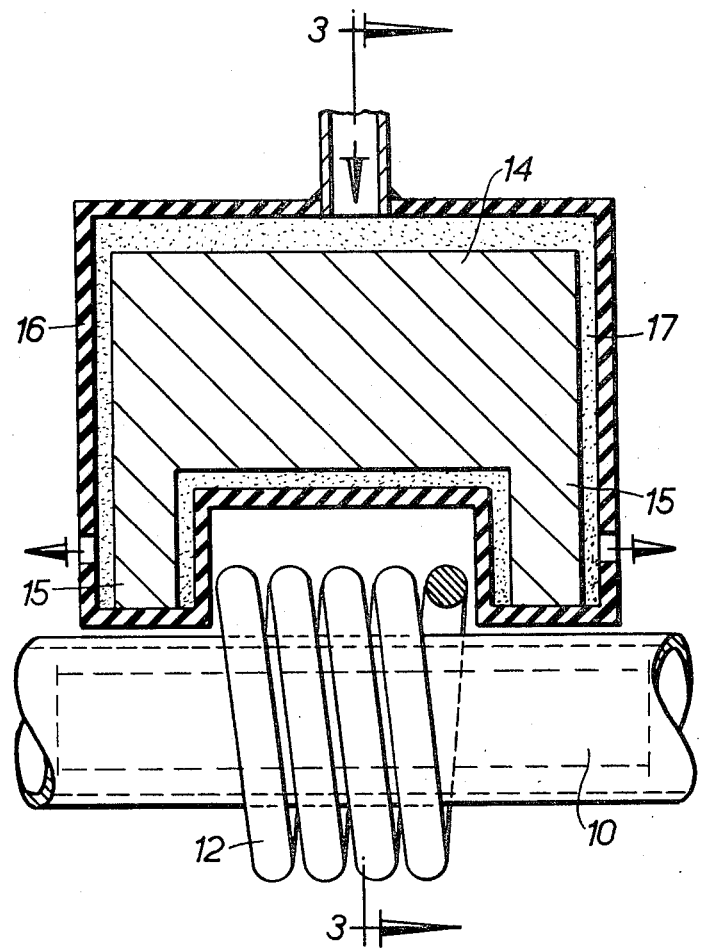

One embodiment of our invention is illustrated in the accompanying drawings in which:

FIGURE 1 is a plan;
FIGURE 2 is a longitudinal section on the line 2—2 of FIGURE 1; and
FIGURE 3 is a transverse section on the line 3—3 of FIGURE 2.

In the drawings 10 is the tube which is formed in the usual way from strip by forming rolls, the edges of the strip meeting at the point 11 where the tube is engaged by opposed closing rolls 10a.

Before reaching the point 11 the edges of the strip are heated to welding temperature by an induction coil 12 surrounding the tube. An impeder 13 of ferrite or other material of high magnetic permeability is located within the tube to reduce the flow of current around the bac of the tube and to concentrate the heating effect in th approaching edges of the strip, the axial length of th impeder being greater than that of the induction coil.

The intensifier which is located over the induction co comprises a longitudinally extending bar 14 of ferrite o similar material of high magnetic permeability which i parallel to the surface of the tube from which it is space and has at each end a radial leg 15 extending toward the surface of the tube at or beyond opposite ends of th induction coil which is bridged by the intensifier as show more particularly in FIGURE 2. The free ends of th legs 15 are located as close as is practicable to the surfac of the tube. The bar 14 may be solid as shown or may b hollow and may be of rectangular, circular, or other con venient cross-section.

Preferably, as shown in the drawings, the intensifier i located in a housing 16 of insulating material throug which water or other coolant 17 is circulated.

Tests with current at a frequency of 450 kilocycles pe second show that the intensifier gives an increase i efficiency and allows the speed of welding for a give amount of power to be considerably increased.

I claim:
1. Apparatus for manufacturing welded tube by th continuous high frequency induction process including a induction coil surrounding the tube a short distance i advance of the weld point, in combination with sai induction coil an intensifier comprising a bridge of mate rial of high magnetic permeability extending lengthwis of the tube over the entire length of the induction co and beyond the ends thereof and in radial alignment wit the gap between the converging edges of the strip fror which the tube is formed.

2. Apparatus as in claim 1 wherein the intensifier com prises a longitudinally extending bar parallel to an spaced from the surface of the tube and having at opposit ends radial legs extending towards the surface of the tub at opposite ends of the induction coil.

3. Apparatus as in claim 1 wherein the intensifier i located in a housing of insulating material through whic coolant is circulated.

4. Apparatus as in claim 1 wherein an impeder c material of high magnetic permeability is located withi the tube in advance of the weld point.

References Cited

UNITED STATES PATENTS

| | | | |
|---|---|---|---|
| 2,632,079 | 3/1953 | Body | 219—8. |
| 2,672,544 | 3/1954 | Finchelstein et al. | 219—8. |
| 3,037,105 | 5/1962 | Kohler | 219—8. |
| 3,196,241 | 7/1965 | Foxx et al. | 219—8. |

RICHARD M. WOOD, Primary Examiner.
J. G. SMITH, Assistant Examiner.